United States Patent [19]
Tums

[11] 3,869,756
[45] Mar. 11, 1975

[54] SHIRRED CASING STICK WITH REVERSE HELICAL FOLD PATTERN

[75] Inventor: Valdis M. Tums, Palos Park, Ill.

[73] Assignee: Union Carbide Corporation, New York, N.Y.

[22] Filed: May 25, 1973

[21] Appl. No.: 364,137

Related U.S. Application Data

[62] Division of Ser. No. 159,858, July 16, 1971, Pat. No. 3,779,284.

[52] U.S. Cl. .................................................. 17/49
[51] Int. Cl. ........................................... A22c 13/00
[58] Field of Search .......... 17/49, 45, 42; 138/118.1; 99/175

[56] References Cited
UNITED STATES PATENTS

| | | | |
|---|---|---|---|
| 3,454,981 | 7/1969 | Martinek | 17/42 |
| 3,619,854 | 11/1971 | Ilgen et al. | 17/42 |

Primary Examiner—Robert Peshock
Attorney, Agent, or Firm—Franklyn Schoenberg

[57] ABSTRACT

A shirred stick of sausage casing has a plurality of repetitive zones end-to-end. In one zone each successive pleat is axially displaced from its preceding neighbor in a direction counter clockwise to the longitudinal axis of the stick as viewed from one end. In another zone each successive pleat is axially displaced from its preceding neighbor in a direction clockwise to the longitudinal axis of the stick as viewed from the same end. In between the two zones is a transition zone in which successive pleats are substantially free of axial displacement with respect to adjacent pleats. Apparatus for producing such a stick comprises a mandrel secured by movable clamps to a frame, means for feeding tubing to the mandrel, shirring means secured to the frame and associated with the mandrel to shirr the casing, a holdback mounted adjacent to the driving means, and means for reversibly rotating the holdback during shirring of the tubing.

3 Claims, 3 Drawing Figures

SHIRRED CASING STICK WITH REVERSE HELICAL FOLD PATTERN

This application is a division of Ser. No. 159,858 filed July 16, 1971 and now U.S. Pat. No. 3,779,284 issued Dec. 18, 1973.

This invention relates to shirred sticks of sausage casing and refers more particularly to an improved casing stick having a reverse helical fold pattern and to method and apparatus for producing the same.

For the production of a number of varieties of sausages the meat processing industry makes use of artificial casings into which the meat product is stuffed and in which it is processed. Frankfurters of the "skinless" type are the outstanding example of the use of such casings, and a vast number of them is produced annually. As indicated, the meat is stuffed into the casing, and is processed while it is retained in the casing. After processing, the casing is removed from the product. Although a number of materials have been used or suggested for use for casing, by far the largest volume of artificial casing is composed of regenerated cellulose.

The casing is produced in very long lengths of tubing, for instance up to 50 meters, and is flattened and wound on reels. The flattened, reeled tubing is further processed by feeding it onto shirring apparatus in which the tubing is inflated, passed over a mandrel, shirred and compressed. By the shirring step pleats are formed in the casing. By the compression step the pleats are compressed to produce a coherent stick. The degree of compression may be appreciated when it is realized that a popular sized stick containing about 26.5 meters is only about 34 cm. in length. Sticks of different lengths containing correspondingly more or less casing are routinely commercially produced.

In the production of frankfurters, for example, high speed machinery is employed. A supply of casing sticks is placed in a hopper of an automatic stuffing machine. Each stick is fed to and placed successively on the nozzle, or stuffing horn, of the machine through which meat emulsion is pumped into the casing at a high rate of speed. The stuffed casing is divided into short uniform lengths by a linker. In some linking machines, a twist is applied to the casing. The linked frankfurters so formed are cooked, smoked, and cured. After such processing is complete, the casing is removed by a peeling machine, or "peeler."

The demands made on the casing stick by the stuffing, linking and peeling machines are many and exacting. The stick must be straight, its bore uniform and free of obstruction, and the stick must be coherent enough to be resistant to handling less than gently but must deshirr uniformly and rapidly at the proper time. Because the material from which it is made, regenerated cellulose, is highly susceptible to moisture and because moisture pickup (or loss) may be nonuniform, considerable difficulty has been encountered in producing straight, unbowed sticks.

Recently, the industry has adopted on a wide scale the concept of twisting the casing helically about the mandrel during shirring to distribute any inequalities of the casing, for instance, in wall thickness, uniformly about the perimeter to help produce straight sticks. Degrees of twist from 1.5 to 15 turns per casing length have been proposed. Improvements in compression have been attained also in twisted sticks by improved apparatus. Such expedients are disclosed, for example, in U.S. Pat. No. 3,397,069. It has also been proposed to produce what may be termed a "semi-twisted" stick by oscillating the casing about the longitudinal axis of the mandrel, but such sticks have not achieved commercial acceptance, at least in the United States.

Although the twisted stick has been very successful in providing uniformly straight, coherent casing sticks, it has been found to be not entirely satisfactory for use with all apparatus. With some peeling devices, for example, difficulty may be encountered, particularly if the linker used is of the type that twists or pinches off the casing between frankfurter links.

The invention has for its principal object the provision of a shirred casing stick having the advantages of straightness and coherence of a twisted stick but free of the disadvantages of the twisted stick.

In the accompanying drawing

The invention comprises a coherent, self-sustaining stick of shirred and compressed sausage casing having a repetitive succession of zones throughout its length. In one of such zones, each successive pleat is being axially displaced from its preceding neighbor in a direction counter clockwise to the longitudinal axis of the stick as viewed from its first shirred end. In another of such zones each successive pleat is axially displaced from its preceding neighbor in a direction clockwise to the longitudinal axis of the stick as viewed from its first shirred end. A transition zone occurs between these zones in which successive pleats are substantially free of axial displacement.

The invention also comprises a method of producing a casing stick which includes the steps of feeding flattened tubular casing to a hollow mandrel, inflating the casing on the mandrel, shirring the casing through a yielding holdback, and reversibly rotating the holdback about the longitudinal axis of the mandrel during shirring of the casing, each rotation in each direction being 360° about the mandrel.

Further, the invention comprises apparatus including a hollow mandrel supported by openable clamps on a frame; means for feeding flattened casing onto the mandrel; means for inflating the casing on the mandrel; shirring means mounted on the frame and associated with the mandrel for shirring the inflated casing; holdback means mounted on the frame adjacent to and downstream of the shirring means for initial compression of shirred casing; and means for reversibly rotating the holdback means about the longitudinal axis of the mandrel during shirring of the casing thereon.

Figure 1:
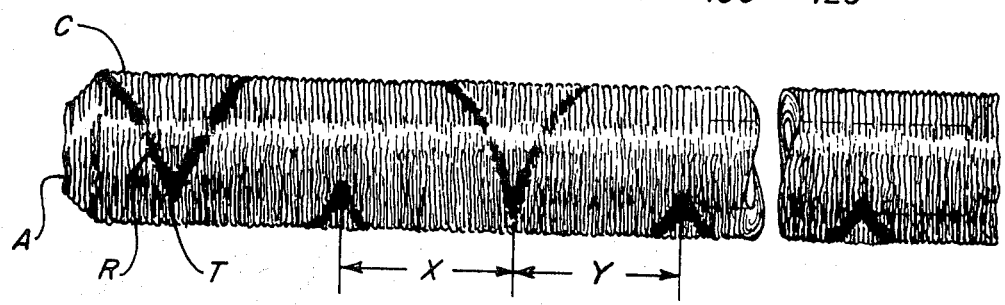
FIG. 1 is a representation of a casing stick embodying the invention, part being broken away.

Referring to the drawing, FIG. 1 illustrates somewhat schematically a shirred stick C of casing embodying the invention, part being broken away. The stick here represented was produced from flattened tubing having a longitudinal stripe R commonly used in the industry for casing identification and as an aid in peeling. The stripe R helically traces the displacement of pleats caused by reversible rotation of the holdback against and through which the casing was shirred. The stripe R as shown appears on the shirred stick C as a continuous wave pattern generally vee-shaped. In successive zones X and y measured between the apices of the vees, the individual pleats of the shirred stick C are successively axially displaced from their preceding neighbors, in the zone X the displacement being clockwise with respect to the mandrel axis when the stick is viewed from the last shirred end A of the stick C, and in the zone Y the displacement being counter clockwise with respect to the mandrel axis when viewed from the same end of the stick. As shown, zones X and Y are repeated on the length of the stick C. Between each zone X and Y is a zone T, the width of the apex of the vee. This zone is the transition zone in which no substantial displacement of pleats with respect to each other occurs and represents the period in which rotation of the holdback has been reversed. This zone is created by lag in the reversing mechanism. It is neither disadvantageous nor apparently advantageous. The more abrupt the operation of the reversing mechanism, the narrower is the zone T, and if reversal is obtained by simple harmonic motion, the zone T will disappear.

In producing the casing stick C the casing material was shirred at a rate of about 300 meters per minute. During shirring, the holdback rotated 360° clockwise about the shirring mandrel, then reversed for 360° counter clockwise about the mandrel. These reversible rotations were repeated at a rate of 100 reversals per minute. Thus, there was a reversal of rotation for every three meters of casing shirred. The reversal or transition time was about one-fortieth of a second, during which time about 12.5 cm. of casing was shirred.

Figure 2:
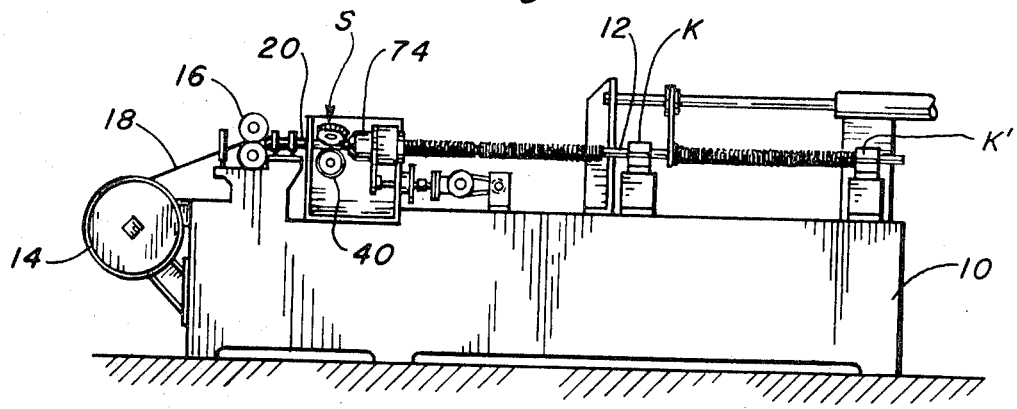
FIG. 2 is a vertical elevation of shirring apparatus suitable for use in producing a casing stick embodying the invention.
Figure 3:
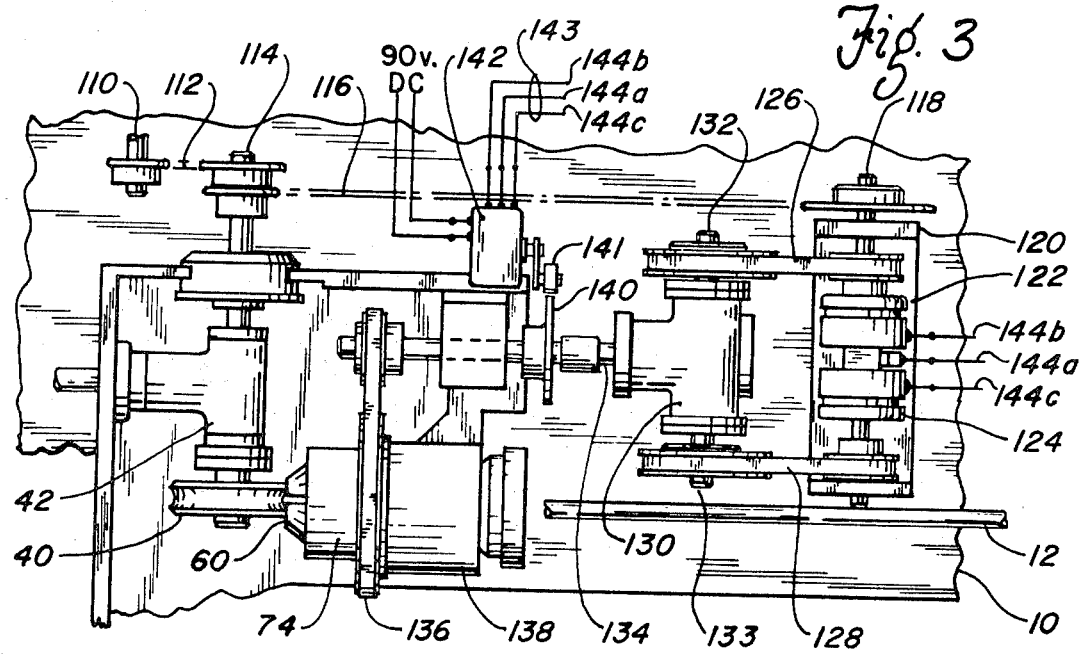
FIG. 3 is a top view of a portion of the apparatus of FIG. 2.

Referring now to FIGS. 2 and 3, apparatus embodying the invention suitable for producing the stick of the invention is there illustrated. As shown in FIG. 2, supported on a frame 10 by a pair of openable clamps K, K' is a hollow mandrel 12. A supply reel 14 of flattened casing 18 is mounted at the opposite end of the frame 10. A shirring means S is secured to the frame 10 between the supply reel 14 and the mandrel supporting clamps K, K', and upstream of the shirring means S is a pair of feed rolls 16 for feeding casing onto the mandrel 12. Air from a source not shown is supplied through the mandrel 12 to inflate the casing 18 (as shown at 20) before it enters the shirring means S. Feed rolls 16 are pressurized to provide a nip preventing inflation of the casing between them and the supply reel 14. Mounted on the frame 10 adjacent to the shirring means S is a holdback chuck 74 against which the inflated casing 20 is shirred.

As shown in the enlarged detail in FIG. 3, the holdback chuck 74 is rotatably mounted in a bearing block 138 secured to the frame 10 so that the holdback chuck 74 can be rotated about the mandrel 12. Chuck 74 has gripping jaws 60 similar to and operated in a manner similar to that referred to in the above cited U.S. Pat. No. 3,397,069. The bearing block 138 is positioned adjacent to the shirring means S, one shirring roll 40 of which is seen. The shirring means S, including the roll 40 (other rolls not being visible in FIG. 3), is driven from a main drive shaft 110 through a sprocket drive 112 and a sub-drive shaft 114 operating through a gear box 42 secured to the frame 10.

Reversible rotation of the holdback chuck 74 is provided by the following drive mechanism. A sprocket drive 116 associated with the shirring sub-drive shaft 114 at one end is connected to a clutch shaft 118 journalled in a base 120 on which are mounted two electric clutches 122, 124. From one clutch 122 a timing belt drive 126 is connected to an input shaft 132 on one side of an angle gear drive 130 and from the other clutch 124 a similar timing belt drive 128 is connected to an input shaft 133 on the other side of the angle gear drive 130. An output shaft 134 from the angle gear drive 130 drives the holdback chuck 74 through a timing belt drive 136. A cam 140 is provided on the output shaft 134, and a cam follower 141 of a limit switch 142 secured to the frame 10 rotatably contacts the cam 140. The switch 142 is connected to an electric power supply and to a three wire cable 143 having a common conductor 144a and additional conductors 144b and 144c so wired to the clutches 122, 124 that one pair of wires (144a, 144b) actuates the first clutch 122 which causes rotation of the shaft 132 and another pair of wires (144a, 144c) actuates the second clutch 124 to cause rotation of the shaft 133. Through the angle drive 130, rotation of the shaft 132 causes rotation of the holdback chuck 74 in one direction and rotation of the shaft 133 causes rotation of the holdback chuck 74 in the opposite direction all through the belt drive 136. Thus, in operation, as the cam follower 141 of the switch 142 reaches a limit predetermined by a peak on the cam 140, power is cut from one clutch and fed to the other through the three wire cable 144.

Casing sticks embodying the invention have been prepared by the method and on the apparatus described herein. They have been tested in the field on commercial frankfurter producing machines and have proved to be satisfactory in every respect. Thus, the sticks were straight and true. They exhibited excellent coherence and resisted breakage during normal handling in the machines. They appeared to be denser, that is, exhibited greater "lock-up" of pleats than encountered in untwisted sticks. Deshirring during stuffing was uniform, and no problems of the type encountered with twisted sticks in linking and peeling were observed.

It will be apparent to those skilled in machine design that the reversing mechanism described herein for purposes of illustration may be changed in a number of respects. Similarly, it is to be understood that processing details such as times, dimensions, and materials are given to illustrate the principles of the invention but that such details may be changed to suit the convenience of the manufacturer without departing from the scope of the invention.

It will also be apparent to those skilled in the shirring art that, while the reversibly rotating holdback herein described is the preferred embodiment of the apparatus aspects of the present invention, the inventive shirred casing stick may alternatively be produced by reversibly rotating the shirring mandrel or the shirring head with respect to the shirring passage.

What is claimed is:

1. In a method for producing shirred cohesive sticks of sausage casing which comprises the step of shirring inflated casing on a mandrel against a holdback to pleat and compress the casing; the improvement which comprises rotating said casing axially about said mandrel in a clockwise direction; reversing the rotation of said casing about said mandrel to counter clockwise rotation; and continuing repetitive cycles of clockwise and counter clockwise rotation of said casing during shirring thereof to provide a shirred, coherent stick of desired length.

2. In the method as defined by claim 1, the further improvement in which rotation of said casing is obtained by rotation of said holdback.

3. In the method as defined by claim 1, the further improvement in which reversible rotation is accomplished at a ratio of about 100 reversals to 300 meters of casing shirred.

* * * * *